R. S. KINKEAD.
VARIABLE TRANSMISSION MECHANISM FOR TRACTORS.
APPLICATION FILED OCT. 18, 1915.
1,231,031.
Patented June 26, 1917.
3 SHEETS—SHEET 1.
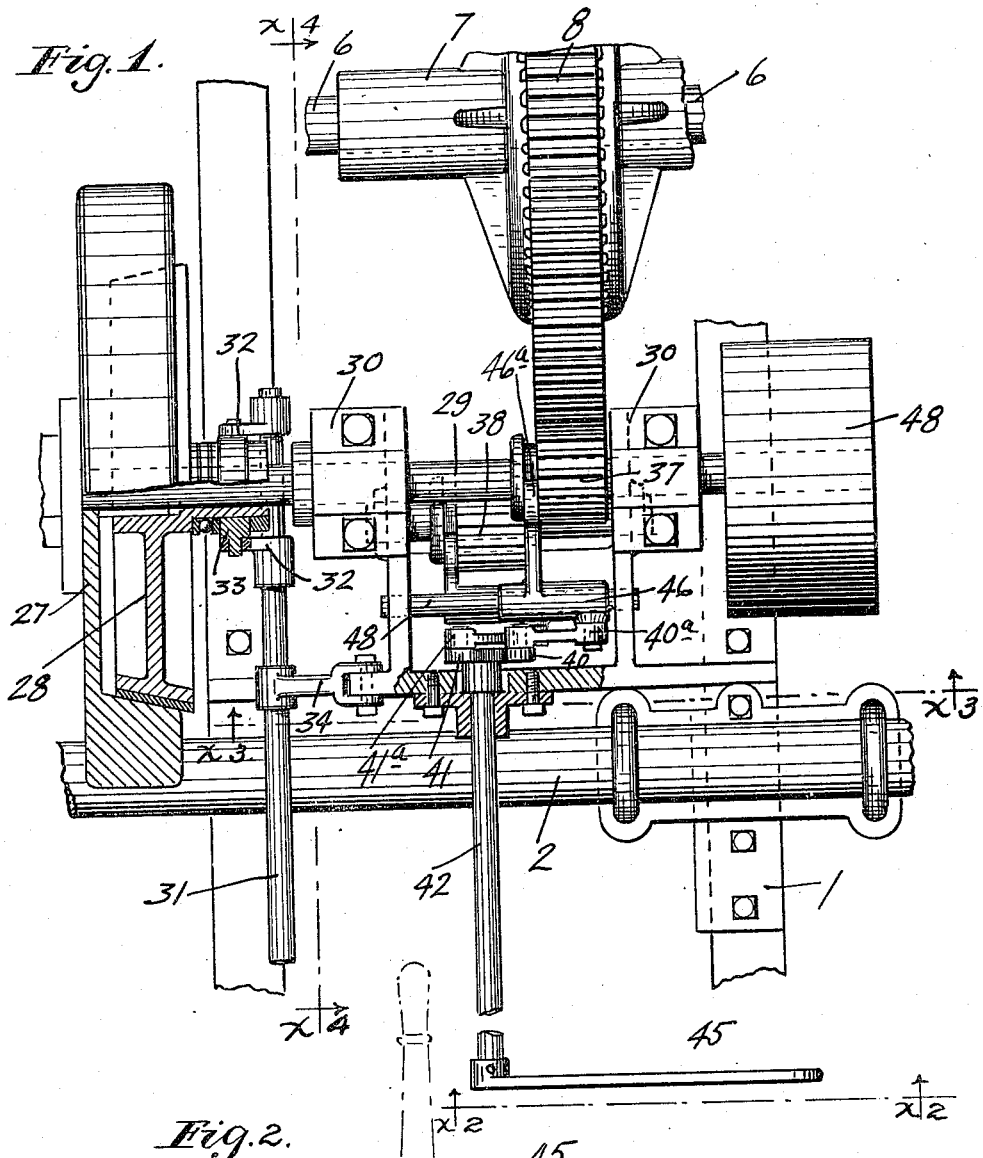

R. S. KINKEAD.
VARIABLE TRANSMISSION MECHANISM FOR TRACTORS.
APPLICATION FILED OCT. 18, 1915.
1,231,031.
Patented June 26, 1917.
3 SHEETS—SHEET 2.
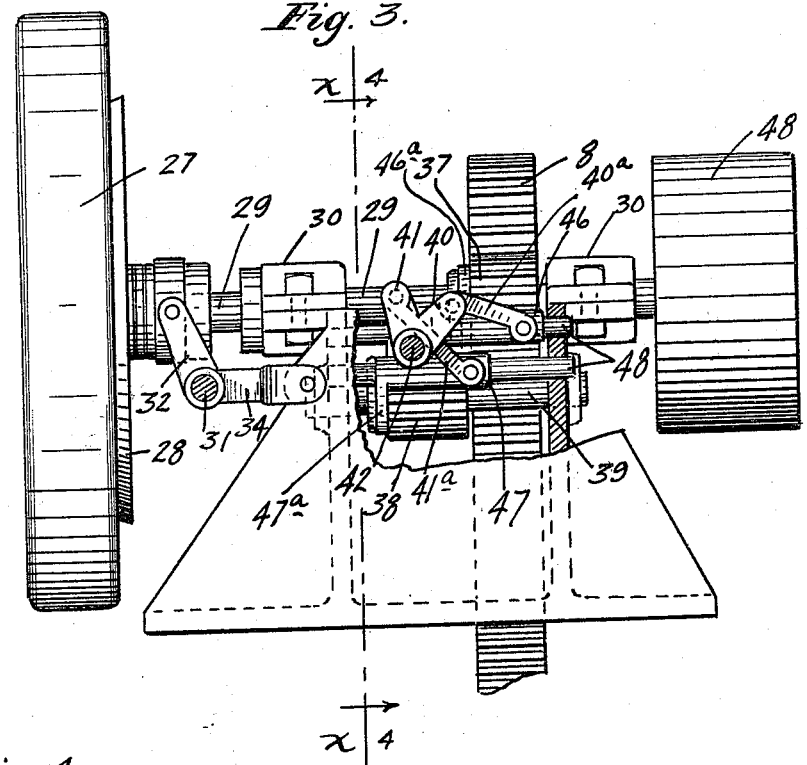
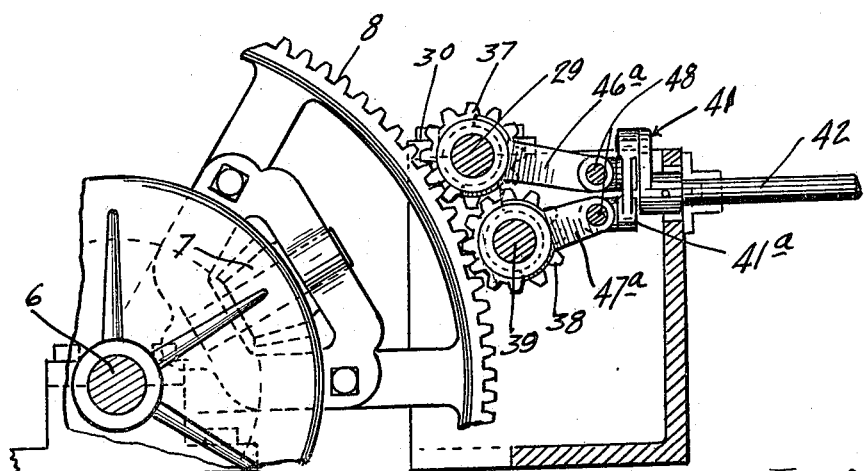
Witnesses
E. C. Skinkle
G. F. Williamson
Inventor
R. S. Kinkead
By his Attorneys
Williamson & Merchant

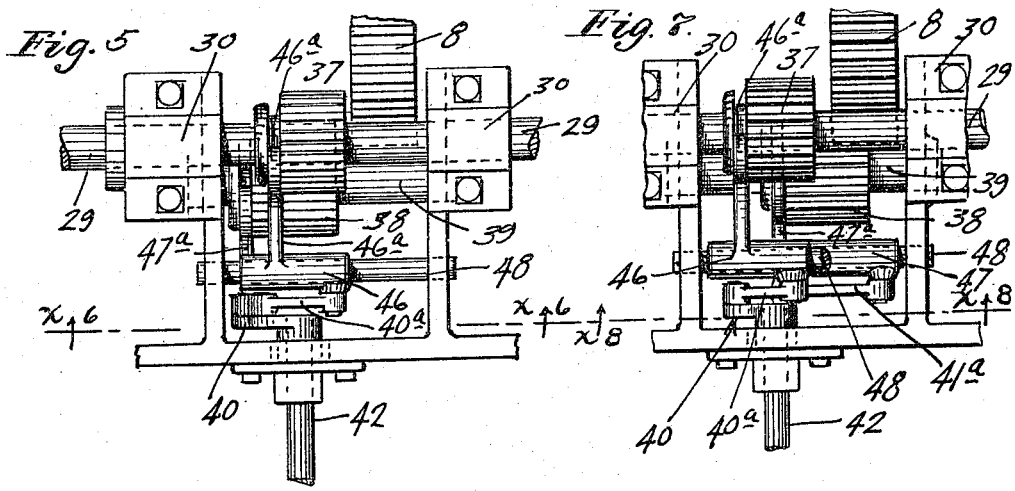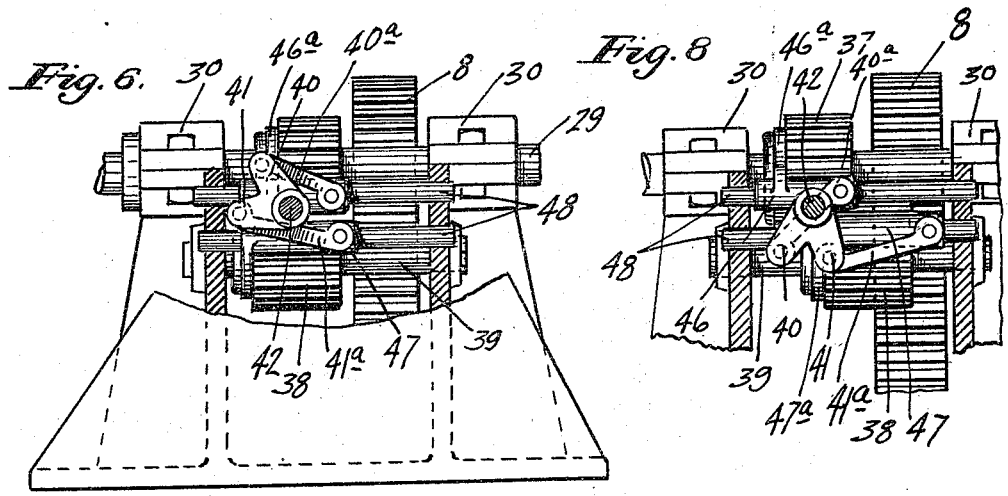

UNITED STATES PATENT OFFICE.

ROBERT STANARD KINKEAD, OF MINNEAPOLIS, MINNESOTA, ASSIGNOR TO WILLIAM BAER EWING, OF MINNEAPOLIS, MINNESOTA.

VARIABLE TRANSMISSION MECHANISM FOR TRACTORS.

1,231,031. Specification of Letters Patent. Patented June 26, 1917.

Application filed October 18, 1915. Serial No. 56,367.

*To all whom it may concern:*

Be it known that I, ROBERT STANARD KINKEAD, a citizen of the United States, residing at Minneapolis, in the county of Hennepin and State of Minnesota, have invented certain new and useful Improvements in Variable Transmission Mechanism for Tractors; and I do hereby declare the following to be a full, clear, and exact description of the invention, such as will enable others skilled in the art to which it appertains to make and use the same.

My invention has for its object the provision of an improved transmission mechanism for tractors, and to such ends, generally stated, the invention consists of the novel devices and combinations of devices hereinafter described and defined in the claims.

The transmission mechanism herein disclosed and claimed is also disclosed but not claimed in the application for improved "Tractor," of myself, Robert S. Kinkead and Paul B. Ford.

In the accompanying drawings which illustrate the invention, like characters indicate like parts throughout the several views.

Referring to the drawings:

Figure 1 is a view chiefly in plan but with some parts in horizontal section and some parts broken away, showing the improved transmission mechanism as applied to the tractor;

Fig. 2 is a view showing certain parts found in the vicinity of the line marked $x^2 \ x^2$ on Fig. 1;

Fig. 3 is a vertical section taken on the line $x^3 \ x^3$ on Fig. 1;

Fig. 4 is a vertical section taken on the line $x^4 \ x^4$ on Fig. 1;

Fig. 5 is a plan view of the gears shown in Figs. 3 and 4, some parts being broken away;

Fig. 6 is a section on the line $x^6 \ x^6$ on Fig. 5;

Fig. 7 is a view corresponding to Fig. 5 but illustrating different portions of the parts; and Fig. 8 is a section taken on the line $x^8 \ x^8$ on Fig. 7 showing the parts in the same position as in Fig. 7.

In the following detailed description, the various elements shown are indicated by the same index numerals that are applied thereto in the said companion application of R. S. Kinkead and Paul B. Ford, above identified.

The numeral 1 indicates portions of the tractor frame, the numeral 2 the rear axle of the tractor, the numeral 27 an internal cone clutch carried by the engine crank shaft. The numeral 29 indicates a shaft axially alined with the engine crank shaft, but primarily not connected thereto, and journaled in the prongs of a bearing bracket 30 secured on the frame 1. The numeral 28 indicates a cone clutch carried to rotate with, but mounted to slide on the shaft 29 and adapted to be moved into and out of frictional engagement with the clutch member 27, to connect the shaft 29 to the engine crank shaft and to disconnect the same therefrom. The sliding clutch cone 28 is adapted to be shifted to and from operative position, at will, by means of an oscillating actuating rod 31 provided at its front end with an arm 32 pivoted to a collar 33 swiveled on the upper part of the cone 28. The front end of the rod 31 is journaled in an arm 34 connected to a flange of the bracket 30.

The numeral 6 indicates a divided shaft, the ends of which, in a tractor, will be independently connected by pinions and gears carried by the traction wheels. The abutting ends of these divided shaft sections 6 are connected by a differential gear 7 of well known construction, the master gear of which is indicated by the numeral 8.

The numeral 37 indicates a pinion carried to rotate with, but slide upon the shaft 29 and adapted to be slid into and out of mesh with the master wheel 8 of the differential gear 7. When the tractor is driven forward, power is transmitted from the engine crank shaft and shaft 29, to the master wheel 8 of the differential gear, directly through the said pinion 37, and for direct forward drive no other gear is required. However, for reverse drive, I provide a second pinion 38 which is like the pinion 37 and is positioned for axial movement into and out of mesh with the master gear 8 of the differential, and into and out of mesh with the said pinion 37. This pinion 38 is free to slide and rotate upon a shaft or spindle 39, the ends of which are secured in the prongs of the bearing bracket 30. Means is provided for sliding the pinions 37 and 38 in such manner that when said pinion 37 is in mesh with the master gear 8 the pinion 38 will be moved out of engagement therewith, and on the other hand, when the pinion 38 is slid into mesh with the said master gear and with the said pinion 37, said pinion 37 will be slid out of mesh with the said master gear, so that then the tractor will be driven backward. The device for accomplishing these movements of the said pinions involves novelty. As preferably arranged, it comprises two arms 40 and 41 shown as in the form of a bell crank secured to a rock shaft or operating rod 42 journaled in a suitable bearing on the bearing bracket 30, and in the bearing 44 on the lug 21 of the upright sleeve 11. At its rear end, this rock shaft 42 is provided with an operating lever or hand-piece 45, by means of which it may be readily oscillated. The arms 40 and 41, respectively, are connected by links 40ᵃ and 41ᵃ, to sleeves 46 and 47 on guide rods 48 rigidly secured to the prongs of the bearing bracket 30. The said sleeves 46 and 47 are provided, respectively, with projecting arms 46ᵃ and 47ᵃ, the ends of which are forked and engage loosely in annular grooves formed in the hubs of the pinions 37 and 38, respectively.

In view of the fact that the arms 40 and 41 are set, one ahead of the other, the pinions 37 and 38 will be given differential sliding movements so as to cause the said pinions to be engaged with each other and with the master gear 8 in the manner above indicated. Figs. 3, 6 and 8 illustrate three different positions of the said gears and pinions.

Fig. 1 shows the gears adjusted for causing the engine to drive the tractor forward. Figs. 5 and 6 show the pinions 37 and 38 out of mesh with the master gear 8, so that the shaft 29 may be driven from the engine without driving the tractor, as for example, when required to transmit power from the engine for various farming or commercial purposes, using the tractor as a stationary engine, and at which time the power will be transmitted from a pulley 48 on the outer end of the shaft 29. Figs. 7 and 8 show the said pinions adjusted for causing the engine to drive the tractor backward.

What I claim is:

1. In a transmission mechanism, the combination with a driving shaft and a master wheel, of a direct-drive pinion on said driving shaft slidable into and out of mesh with said master wheel, a reverse-drive pinion mounted for axial sliding movements into and out of mesh with said master wheel, and pinion actuating connections arranged to move said reverse-drive pinion out of mesh with said master wheel, when said direct-drive pinion is moved into mesh with said master wheel, and to move said direct-drive pinion out of mesh with said master wheel and into mesh with said reverse-drive pinion, when the latter is moved into mesh with said master wheel, the said pinion actuating connection comprising a rock shaft provided with arms set one ahead of the other, and link connections between said arms and said pinions permitting free rotation of said pinions while controlling their axial positions.

2. In a transmission mechanism, the combination with a driving shaft and a master wheel, of a direct-drive pinion on said driving shaft slidable into and out of mesh with said master wheel, a reverse drive-pinion mounted for axial sliding movements into and out of mesh with said master wheel, pinion actuating connections arranged to move said reverse-drive pinion out of mesh with said master wheel, when said direct-drive pinion is moved into mesh with said master wheel, and to move said direct-drive pinion out of mesh with said master wheel and into mesh with said reverse-drive pinion, when the latter is moved into mesh with said master wheel, the said pinion actuating connections comprising cranks set circumferentially, one ahead of the other, links independently connecting said cranks to the respective pinions, and means for imparting common oscillatory movements to the said cranks, the said cranks being so set that the one will be moved closely in the vicinity of the dead center, in respect to its coöperating link, while the other crank is at a much greater angle in respect to its coöperating link, whereby one of the pinions will remain approximately stationary while the other is being given movement to and from operative position.

In testimony whereof I affix my signature in presence of two witnesses.

ROBERT STANARD KINKEAD.

Witnesses:
 GEO. M. SEWARD,
 M. A. PHILLIPS.